(12) United States Patent  (10) Patent No.: US 9,402,225 B2
Hao  (45) Date of Patent: Jul. 26, 2016

(54) DETECTING METHOD AND DEVICE FOR A TERMINAL

(71) Applicant: Huawei Technologies Co., Ltd., Shenzhen, Guangdong (CN)

(72) Inventor: Jian Hao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 247 days.

(21) Appl. No.: 14/333,211

(22) Filed: Jul. 16, 2014

(65) Prior Publication Data

US 2015/0023192 A1  Jan. 22, 2015

(30) Foreign Application Priority Data

Jul. 17, 2013 (CN) .......................... 2013 1 0302640

(51) Int. Cl.
*H04L 1/00* (2006.01)
*H04W 48/10* (2009.01)
*H04W 24/04* (2009.01)
*H04W 48/12* (2009.01)

(52) U.S. Cl.
CPC .............. *H04W 48/10* (2013.01); *H04W 24/04* (2013.01); *H04W 48/12* (2013.01); *Y02B 60/50* (2013.01)

(58) Field of Classification Search
CPC . H04W 48/12; H04W 52/0216; H04W 28/18; H04W 48/16; H04W 48/10; H04W 72/005
See application file for complete search history.

(56) References Cited

U.S. PATENT DOCUMENTS

| | | | |
|---|---|---|---|
| 2008/0084844 A1* | 4/2008 | Reznik ................. | H04L 1/0025 370/330 |
| 2013/0143548 A1* | 6/2013 | Rayavarapu .......... | H04W 48/20 455/423 |
| 2013/0223235 A1* | 8/2013 | Hu ........................ | H04W 36/04 370/242 |

OTHER PUBLICATIONS

"3rd Generation Partnership Project; Technical Specification Group Radio Access Network; Radio Resource Control (RRC); Protocol specification (Release 10)," 3GPP TS 25.331, V10.5.0, pp. 1-1882, 3rd Generation Partnership Project, Valbonne, France (Sep. 2011).

* cited by examiner

*Primary Examiner* — Yemane Mesfin
*Assistant Examiner* — Abdelillah Elmejjarmi
(74) *Attorney, Agent, or Firm* — Leydig, Voit & Mayer, Ltd.

(57) ABSTRACT

The present invention provides a detecting method and device for a terminal and relates to the communications field, which can, when cell broadcast and paging messages cannot be acquired in time, read system information proactively within an appropriate time to acquire an enabled or disabled state of cell broadcast at that time, and, according to the current state, continue or stop receiving cell broadcast information messages, so as to decrease unnecessary decoding operations, reduce power consumption of the terminal, increase a cell broadcast message receiving rate, and save communication resources. This is implemented by defining a first time on a terminal and attempting to decode common traffic channel information in a cycle preset by a hysteresis timer, and further, attempting to receive system information according to different decoding results, and finally, according to a system state indicated in the system information, taking an action to continue or stop the reception.

4 Claims, 4 Drawing Sheets

DETECTING METHOD AND DEVICE FOR A TERMINAL

CROSS-REFERENCE TO RELATED APPLICATIONS

This application claims priority to Chinese Patent Application No. 201310302640.3, filed on Jul. 17, 2013, which is hereby incorporated by reference in its entirety.

TECHNICAL FIELD

The present invention relates to the communications field, and in particular, to a detecting method and device for a terminal.

BACKGROUND

At present, CBS (Cell Broadcast Service, cell broadcast service), which provides a means for an operator to send group messages to group users in a specific geographical location, is often used to send emergency notices such as weather, earthquake, and tsunami warnings. On one hand, after the CBS service is activated, a UE (User Equipment, user equipment) needs to periodically acquire an enabled or disabled state of the CBS service in a cell where the UE is located so that the UE can learn from SIB5 (System Information Block 5, system information block 5) in time whether a CBS channel is enabled. Due to reasons such as a poor network environment, however, the UE cannot acquire the state of CBS through SIB5. Therefore, after CBS is disabled, the UE continuously attempts to acquire CBS information, which increases power consumption of the UE and occupies communication resources.

On the other hand, when system information in the cell changes, a paging message is used to notify the UE. In this way, after receiving the paging message, the UE acquires the changed information by decoding the system information. However, due to problems such as restricted base station coverage or interference, the paging message cannot be received by the UE in time. As a result, the UE cannot acquire the changed system information by decoding, which delays reception of the information and increases power consumption of the UE.

SUMMARY

An embodiment of the present invention provides a detecting method and device for a terminal, which can, when cell broadcast and paging messages cannot be acquired in time, read system information proactively within an appropriate time to acquire an enabled or disabled state of cell broadcast at that time, and, according to the current state, continue or stop receiving cell broadcast information messages, so as to decrease unnecessary decoding operations, reduce power consumption of the terminal, increase a cell broadcast message receiving rate, and save communication resources.

To achieve the foregoing objectives, the embodiments of the present invention use the following technical solutions:

According to a first aspect, a detecting method for a terminal is provided, where the method includes:

activating a hysteresis timer when a first event is triggered, where the first event is that a terminal does not successfully decode common traffic channel information in M consecutive common traffic channel cycles, where M is a natural number;

receiving SIB5 information when the terminal cannot decode the common traffic channel information in N common traffic channel cycles defined by the hysteresis timer, where N is a natural number; and executing, according to an enabled or a disabled state of the common traffic channel indicated in the SIB5 information, an action corresponding to the state.

With reference to the first aspect, in a first possible implementation manner, the executing, according to an enabled or a disabled state of the common traffic channel indicated in the SIB5 information, an action corresponding to the state includes:

when the state of the common traffic channel indicated in the SIB5 information is enabled, deactivating the hysteresis timer, clearing the first event, and continuing receiving cell broadcast information and decoding the common traffic channel information.

With reference to the first aspect, in a second possible implementation manner, the executing, according to an enabled or a disabled state of the common traffic channel indicated in the SIB5 information, an action corresponding to the state includes:

when the state of the common traffic channel indicated in the SIB5 information is disabled, deactivating the hysteresis timer, clearing the first event, and stopping decoding the common traffic channel information.

With reference to the first aspect and the second possible implementation manner of the first aspect, in a third possible implementation manner, the enabled or disabled state of the common traffic channel indicated in the SIB5 information is indicated by an information element of secondary common control physical channel system information, where the secondary common control physical channel is used to bear the common traffic channel.

According to a second aspect, a detecting device for a terminal is provided, where the device includes:

a timer activating unit, configured to activate a hysteresis timer when a first event is triggered, where the first event is that a terminal does not successfully decode common traffic channel information in M consecutive common traffic channel cycles, where M is a natural number;

a message receiving unit, configured to receive SIB5 information when the terminal cannot decode the common traffic channel information in N common traffic channel cycles defined by the hysteresis timer, where N is a natural number; and an executing unit, configured to execute, according to an enabled or a disabled state of the common traffic channel indicated in the SIB5 information, an action corresponding to the state.

With reference to the second aspect, in a first possible implementation manner, the executing unit is specifically configured to:

when the state of the common traffic channel indicated in the SIB5 information is enabled, deactivate the hysteresis timer, clear the first event, and continue receiving cell broadcast information and decoding the common traffic channel information.

With reference to the second aspect, in a second possible implementation manner, the executing unit is further specifically configured to:

when the state of the common traffic channel indicated in the SIB5 information is disabled, deactivate the hysteresis timer, clear the first event, and stop decoding the common traffic channel information.

With reference to any one of the second aspect to the second possible implementation manner of the second aspect, in a third possible implementation manner, the enabled or the disabled state of the common traffic channel indicated in the SIB5 information is indicated by an information element of secondary common control physical channel system information, where the secondary common control physical channel is used to bear the common traffic channel.

The present invention provides a detecting method and device for a terminal, including defining a first time on a terminal and attempting to decode common traffic channel information in a cycle preset by a hysteresis timer, and further, according to a decoding result, attempting to receive system information, and finally, according to a system state indicated in the system information, taking an action to continue or stop the reception. In this way, even when cell broadcast and paging messages cannot be acquired in time, system information can be proactively read within an appropriate time to acquire an enabled or disabled state of cell broadcast at that time, and, according to the current state, continue or stop receiving cell broadcast information messages, so as to decrease unnecessary decoding operations, reduce power consumption of the terminal, increase a cell broadcast message receiving rate, and save communication resources.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
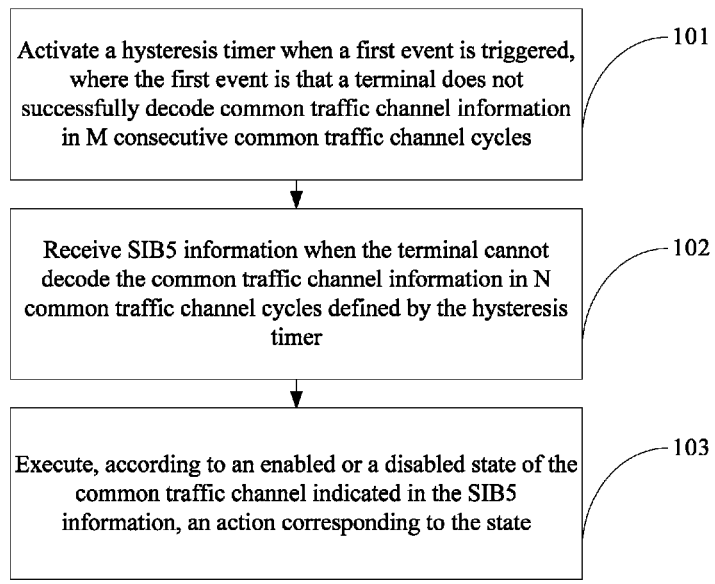
FIG. 1 is a schematic diagram of a detecting method for a terminal according to an embodiment of the present invention.

An embodiment of the present invention provides a detecting method for a terminal. As shown in FIG. 1, the method includes:

101. When a first event is triggered, start a hysteresis timer, where the first event is that a terminal does not successfully decode common traffic channel information in M consecutive common traffic channel cycles, where M is a natural number.

102. When the terminal cannot decode the common traffic channel information in N common traffic channel cycles defined by the hysteresis timer, receive SIB5 information, where N is a natural number.

103. According to an enabled or a disabled state of the common traffic channel indicated in the SIB5 information, execute an action corresponding to the state.

The present invention provides a detecting method for a terminal, including defining a first time on a terminal and attempting to decode common traffic channel information in a cycle preset by a hysteresis timer, and further, according to a decoding result, attempting to receive system information, and finally, according to a system state indicated in the system information, taking an action to continue or stop the reception. In this way, even when cell broadcast and paging messages cannot be acquired in time, system information can be proactively read within an appropriate time to acquire an enabled or disabled state of cell broadcast at that time, and, according to the current state, continue or stop receiving cell broadcast information messages, so as to decrease unnecessary decoding operations, reduce power consumption of the terminal, increase a cell broadcast message receiving rate, and save communication resources.

Figure 2:
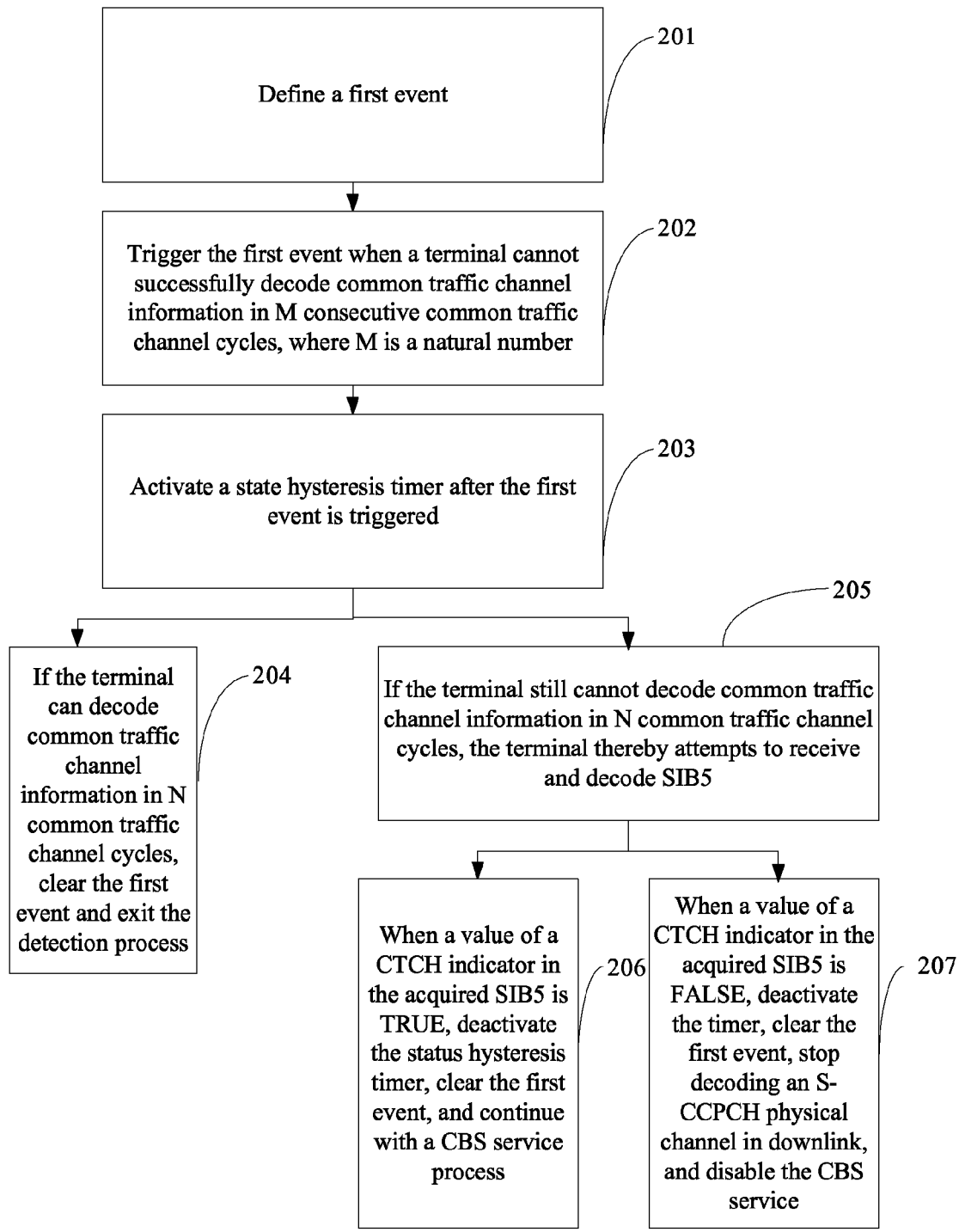
FIG. 2 is a detailed schematic diagram of a detecting method for a terminal according to an embodiment of the present invention.

To help a person skilled in the art understand the technical solution provided by this embodiment of the present invention more clearly, the following describes a method for transmitting data by using specific embodiments of the present invention. As shown in FIG. 2, the method includes:

201. Define a first event.

202. When a terminal cannot successfully decode common traffic channel information in M consecutive common traffic channel cycles, trigger the first event, where M is a natural number.

To make the CBS service proceed normally, each CBS-capable cell is configured with a common traffic channel (Common Traffic Channel, CTCH), and a logical CTCH is borne by an FACH transport channel and finally mapped to a secondary common control physical channel (Secondary Common Control Physical Channel, S-CCPCH). Therefore, the S-CCPCH is used as a physical channel to bear the CTCH.

203. After the first event is triggered, start a state hysteresis timer.

The state hysteresis timer presets N common traffic channel cycles.

204. If the terminal can decode common traffic channel information in N common traffic channel cycles, clear the first event and exit the detection process.

If the terminal can decode the common traffic channel information within the preset time, it indicates that a connection between the terminal and a CBC (Cell Broadcast Center, cell broadcast center) is smooth and that the terminal can receive in time messages sent by the CBC and can correctly stop receiving CBS information after the CBS service is disabled, so as to reduce power consumption of the terminal.

205. If, in the N common traffic channel cycles, the terminal still cannot decode the common traffic channel information, the terminal thereby attempts to receive and decode SIB5.

If the terminal cannot decode the common traffic channel information within the preset time, it indicates that the connection between the terminal and a CBC (Cell Broadcast Center, cell broadcast center) is blocked and that the terminal cannot receive in time messages sent by the CBC and cannot correctly stop receiving CBS information after the CBS is deactivated. As a result, after the CBS service is disabled in the cell, the terminal is still in a working state and attempts to read cell broadcast messages by decoding the S-CCPCH channel. In fact, however, this decoding operation is unnecessary and increases power consumption of the terminal.

206. When a value of a CTCH indicator in the acquired SIB5 is TRUE, deactivate the state hysteresis timer, clear the first event, and continue with a CBS service process.

According to related statements in a Third Generator Partnership Project (3GPP) protocol, whether the CBS service is in an enabled or disabled in the current cell can be determined by a value of the CTCH indicator in an information element of Secondary CCPCH system information. When the value of the CTCH indicator is TRUE, it indicates that the CBS service is enabled in the cell; and when the value of the CTCH indicator is FALSE, it indicates that the CBS service is disabled in the cell. Therefore, the terminal can acquire the state of the CBS service in the current cell by receiving and decoding SIB5 and perform a corresponding operation according to the current state of the CBS service in the cell.

207. When the value FALSE of the CTCH indicator in the acquired SIB5 is FALSE, deactivate the timer, clear the first event, stop decoding the S-CCPCH physical channel in downlink, and disable the CBS service.

Figure 3:
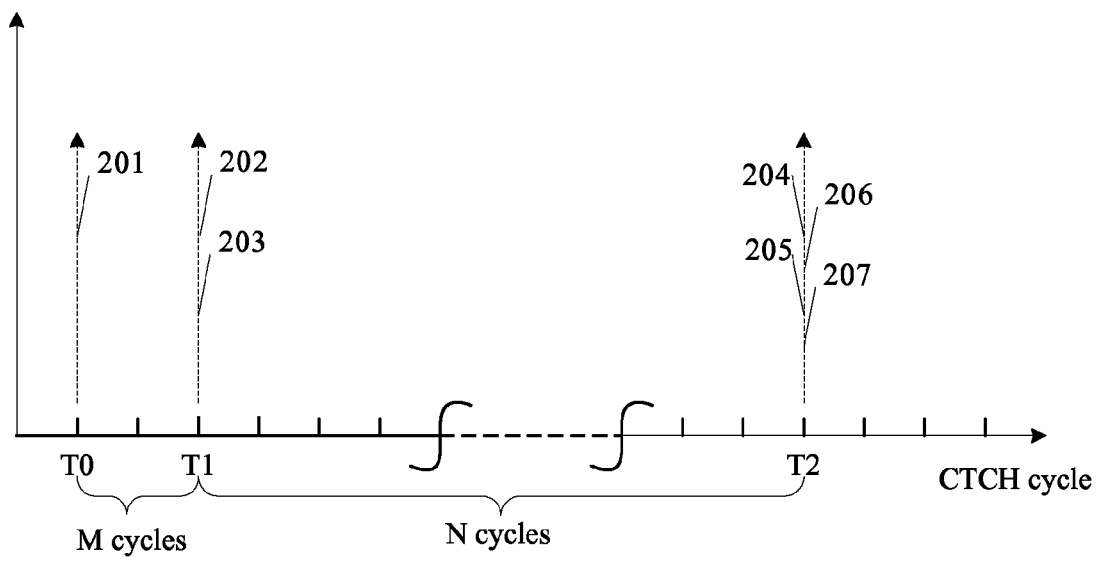
FIG. 3 is a schematic diagram of a process executed by a terminal over a time period according to an embodiment of the present invention.

FIG. 3 shows a specific process in which the terminal performs steps 201 to 206.

In FIG. 3, T0 is defined as a start time of step 201, that is, a time at which the first event is defined. Time from T0 to T1 is the preset M common traffic channel cycles. When the terminal cannot successfully decode the common traffic channel information in the M common traffic channel cycles, at the end of the M cycles, the terminal triggers the first event and activates the state hysteresis timer to start N common traffic channel cycles.

If the terminal can successfully decode the common traffic channel information in the N common traffic channel cycles, the terminal clears the first event and exits the detection process; if the terminal cannot decode the common traffic channel information in the N common traffic channel cycles, the terminal thereby attempts to receive and decode SIB5.

If the value of the CTCH indicator in SIB5 is TRUE, the terminal deactivates the state hysteresis timer, clears the first event, and continues with the CBS service process; if the value of the CTCH indicator in SIB5 is FALSE, the terminal deactivates the timer, clears the first event, stops decoding the S-CCPCH physical channel in downlink, and disables the CBS service.

The present invention provides a detecting method for a terminal, including defining a first time on a terminal and attempting to decode common traffic channel information in a cycle preset by a hysteresis timer, and further, according to a decoding result, attempting to receive system information and finally, according to a system state indicated in the system information, taking an action to continue or stop the reception. In this way, even when cell broadcast and paging messages cannot be acquired in time, system information can be proactively read within an appropriate time to acquire an enabled or disabled state of cell broadcast at that time, and, according to the current state, continue or stop receiving cell broadcast information messages, so as to decrease unnecessary decoding operations, reduce power consumption of the terminal, increase a cell broadcast message receiving rate, and save communication resources.

Figure 4:
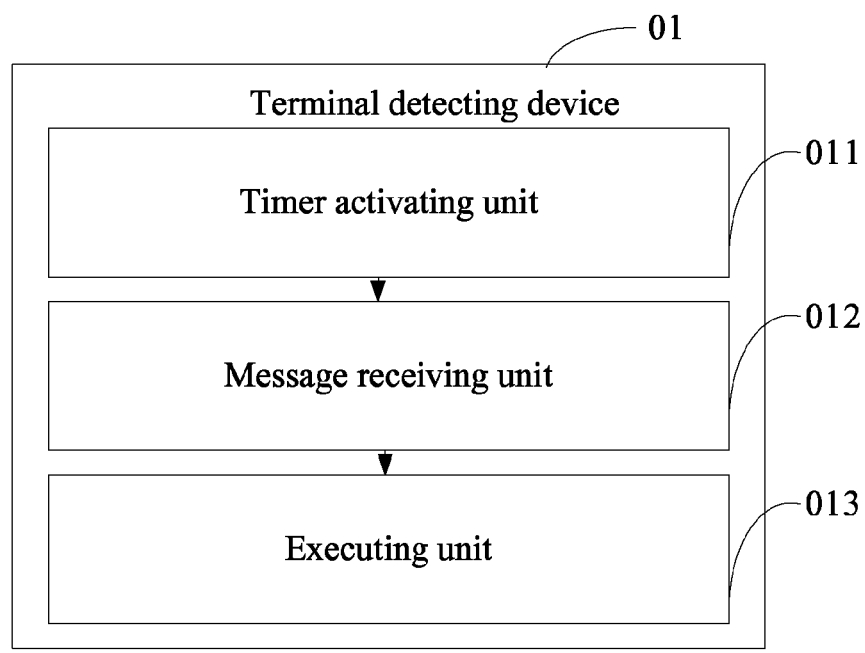
FIG. 4 is a schematic structural diagram of a detecting device for a terminal according to an embodiment of the present invention.

An embodiment of the present invention provides a detecting device 01 for a terminal. As shown in FIG. 4, the device includes:

a timer activating unit 011, configured to activate a hysteresis timer when a first event is triggered, where the first event is that a terminal does not successfully decode common traffic channel information in M consecutive common traffic channel cycles, where M is a natural number;

a message receiving unit 012, configured to receive SIB5 information when the terminal cannot decode the common traffic channel information in N common traffic channel cycles defined by the hysteresis timer, where N is a natural number; and an executing unit 013, configured to execute, according to an enabled or disabled state of the common traffic channel indicated in the SIB5 information, an action corresponding to the state.

The executing unit 013 is specifically configured to:
when the state of the common traffic channel indicated in the SIB5 information is enabled, deactivate the hysteresis timer, clear the first event, and continue receiving cell broadcast information and decoding the common traffic channel information.

Further, the executing unit 013 is specifically configured to:
when the state of the common traffic channel indicated in the SIB5 information is disabled, deactivate the hysteresis timer, clear the first event, and stop decoding the common traffic channel information.

In an embodiment of the present invention, the enabled or disabled state of the common traffic channel indicated in the SIB5 information is indicated by an information element of secondary common control physical channel system information, where the secondary common control physical channel is used to bear the common traffic channel.

The present invention provides a detecting device for a terminal, which can define a first time on a terminal and attempt to decode common traffic channel information in a cycle preset by a hysteresis timer, and further, according to a decoding result, attempt to receive system information, and finally, according to a system state indicated in the system information, take an action to continue or stop the reception. In this way, even when cell broadcast and paging messages cannot be acquired in time, system information can be proactively read within an appropriate time to acquire an enabled or disabled state of cell broadcast at that time, and, according to the current state, continue or stop receiving cell broadcast information messages, so as to decrease unnecessary decoding operations, reduce power consumption of the terminal, increase a cell broadcast message receiving rate, and save communication resources.

Figure 5:
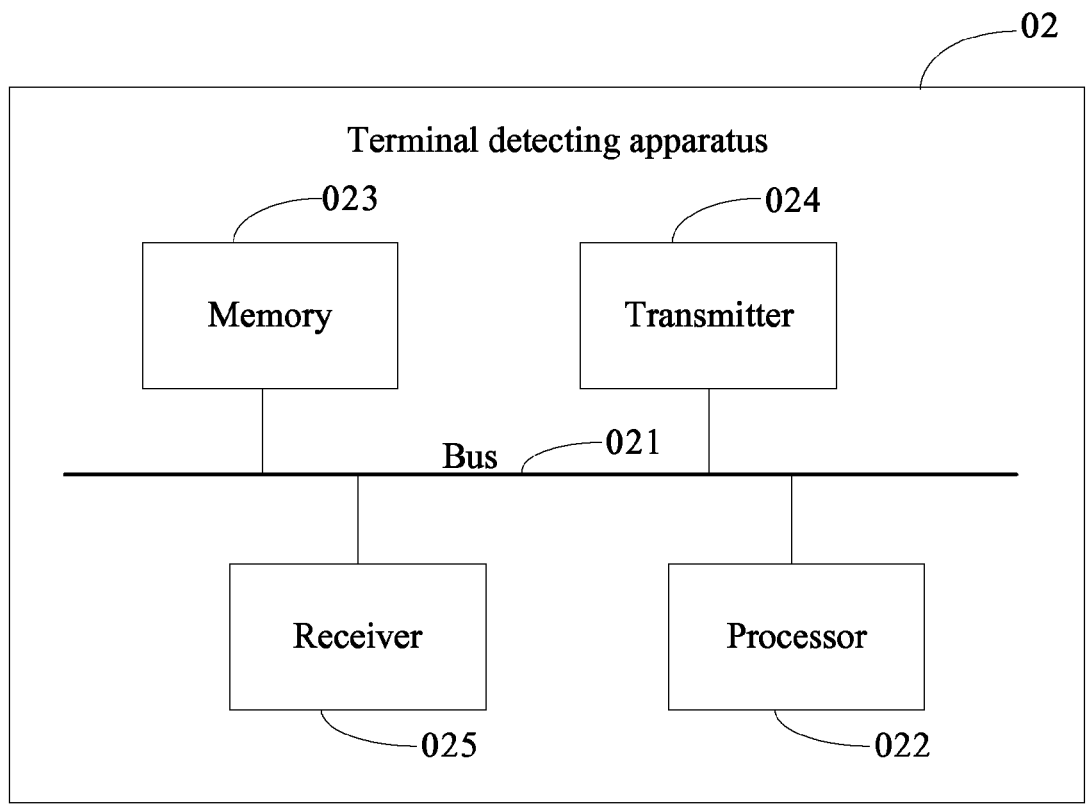
FIG. 5 is a schematic structural diagram of a detecting apparatus for a terminal according to an embodiment of the present invention.

An embodiment of the present invention provides a detecting apparatus 02 for a terminal. As shown in FIG. 5, the apparatus 02 includes: a bus 021, and a processor 022, a memory 023, a transmitter 024, and a receiver 025 that are connected to the bus 021, where the memory 023 is configured to store an instruction and the processor 022 executes the instruction to activate a hysteresis timer when a first event is triggered, where the first event is that a terminal does not successfully decode common traffic channel information in M consecutive common traffic channel cycles, where M is a natural number; the processor 022 executes the instruction to receive SIB5 information when the terminal cannot complete decoding of the common traffic channel information in N common traffic channel cycles defined by the hysteresis timer, where N is a natural number; the processor 022 executes the instruction to execute, according to an enabled or disabled state of the common traffic channel indicated in the SIB5 information, an action corresponding to the state.

In an embodiment of the present invention, optionally, the executing, by the processor 022, the instruction to execute, according to an enabled or disabled state of the common traffic channel indicated in the SIB5 information, an action corresponding to the state, specifically includes:

when the state of the common traffic channel indicated in the SIB5 information is enabled, deactivating the hysteresis timer, clearing the first event, and continuing receiving cell broadcast information and decoding the common traffic channel information.

In an embodiment of the present invention, optionally, the executing, by the processor 022, the instruction to execute, according to an enabled or disabled state of the common traffic channel indicated in the SIB5 information, an action corresponding to the state, specifically includes:

when the state of the common traffic channel indicated in the SIB5 information is disabled, deactivating the hysteresis timer, clearing the first event, and stopping decoding the common traffic channel information.

In an embodiment of the present invention, optionally, in the step of executing, by the processor 022, the instruction to execute, according to different states of the common traffic channel indicated in the SIB5 information, a corresponding action:

the enabled or disabled state of the common traffic channel indicated in the SIB5 information is indicated by an information element of secondary common control physical channel system information, where the secondary common control physical channel is used to bear the common traffic channel.

The present invention provides a detecting apparatus for a terminal, which can define a first time on a terminal and attempt to decode common traffic channel information in a cycle preset by a hysteresis timer, and further, according to a decoding result, attempt to receive system information, and finally, according to a system state indicated in the system information, take an action to continue or stop the reception. In this way, even when cell broadcast and paging messages cannot be acquired in time, system information can be proactively read within an appropriate time to acquire an enabled or disabled state of cell broadcast at that time, and, according to the current state, continue or stop receiving cell broadcast information messages, so as to decrease unnecessary decoding operations, reduce power consumption of the terminal, increase a cell broadcast message receiving rate, and save communication resources.

In the several embodiments provided in the present application, it should be understood that the disclosed apparatus and method may be implemented in other manners. For example, the described apparatus embodiment is merely exemplary. For example, the unit division is merely a logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) to perform a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The invention claimed is:

1. A detecting method for a terminal, the method comprising: activating a hysteresis timer when a first event is triggered, wherein the first event comprises that a terminal does not successfully decode common traffic channel information in M consecutive common traffic channel cycles, wherein M is a natural number; receiving SIB5 (System Information Block 5) information when the terminal cannot decode the common traffic channel information in N common traffic channel cycles defined by the hysteresis timer, wherein N is a natural number; and executing an action according to an enabled state or a disabled state of the common traffic channel indicated in the SIB5 information, wherein the executing the action comprises: when a state of the common traffic channel indicated in the SIB5 information is the enabled state, deactivating the hysteresis timer, clearing the first event, and continuing receiving cell broadcast information and decoding the common traffic channel information, and when a state of the common traffic channel indicated in the SIB5 information is the disabled state, deactivating the hysteresis timer, clearing the first event, and stopping decoding the common traffic channel information.

2. The method according to claim 1, wherein the enabled state or the disabled state of the common traffic channel indicated in the SIB5 information is indicated by an information element of secondary common control physical channel system information, wherein the secondary common control physical channel is used to bear the common traffic channel.

3. A detecting device for a terminal, the detecting device comprising: an activating timer to activate a hysteresis timer when a first event is triggered, wherein the first event comprises that a terminal does not successfully decode common traffic channel information in M consecutive common traffic channel cycles, wherein M is a natural number; a message receiver configured to, when the terminal cannot decode the common traffic channel information in N common traffic channel cycles defined by the hysteresis timer, receive SIB5 (System Information Block 5) information, wherein N is a natural number; and a processor configured to: execute an action according to an enabled state or a disabled state of the common traffic channel indicated in the SIB5 information, when a state of the common traffic channel indicated in the SIB5 information is the enabled state, deactivate the hysteresis timer, clear the first event, and continue receiving cell broadcast information and decoding the common traffic channel information, and when a state of the common traffic channel indicated in the SIB5 information is the disabled state, deactivate the hysteresis timer, clear the first event, and stop decoding the common traffic channel information.

4. The detecting device according to claim 3, wherein the enabled state or the disabled state of the common traffic channel indicated in the SIB5 information is indicated by an information element of secondary common control physical channel system information, wherein the secondary common control physical channel is used to bear the common traffic channel.

* * * * *